Jan. 11, 1955   W. J. GOSSELIN   2,699,186
TIP FOR WEAVING SHUTTLES
Filed July 31, 1952
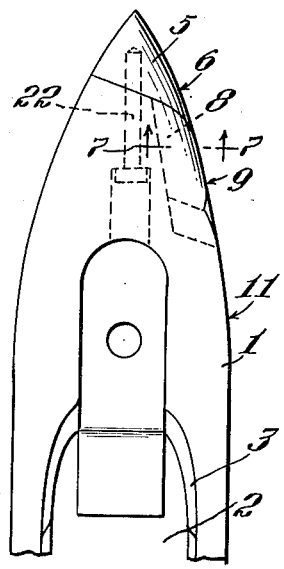
Fig.1
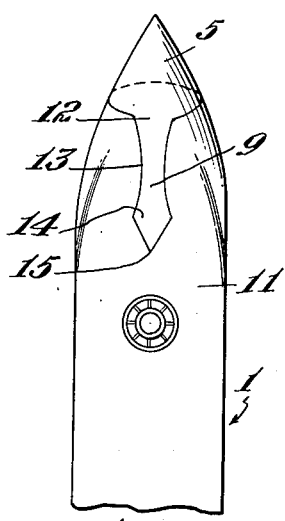
Fig.2
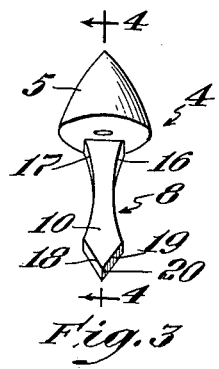
Fig.3
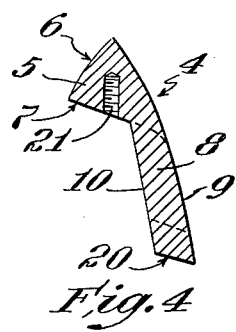
Fig.4
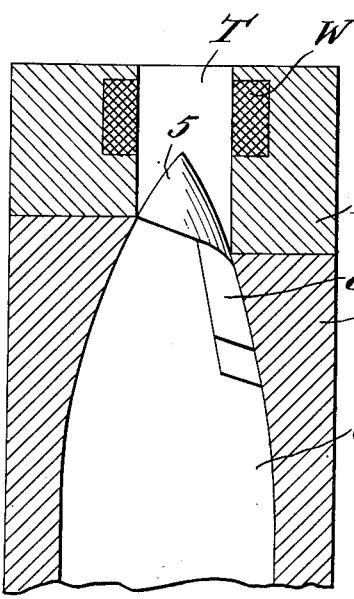
Fig.6
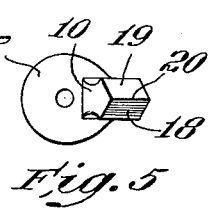
Fig.5
Fig.7
Inventor
Wilfred J. Gosselin
by Roberts Cushman Crowe
att'ys.

United States Patent Office 2,699,186
Patented Jan. 11, 1955

2,699,186

TIP FOR WEAVING SHUTTLES

Wilfrid J. Gosselin, Methuen, Mass., assignor to U S Bobbin & Shuttle Company, Lawrence, Mass., a corporation of Rhode Island Application July 31, 1952, Serial No. 301,847

4 Claims. (Cl. 139—196)

This invention relates to weaving shuttles and more especially to a tip for such a shuttle. Heretofore shuttle bodies have customarily been made from wood, the opposite ends of the wood body being protected by metal tips. Usually the tip is comprised of an exposed conical head having an integral axial stem which is driven into a bore of the wood in the shuttle body and held in place by glue or mechanical retaining elements.

Recently it has been proposed to make shuttles from a moulded plastic. In my copending application for Letters Patent Serial No. 247,052 filed September 18, 1951, now Patent No. 2,658,533, I disclose a method of anchoring a metal tip to the shuttle body during the moulding of the latter from plastic material. In the method thus disclosed use is made of a metal tip having a stem which is coaxial with the head according to conventional prior practice. In the moulding operation the plastic material is expected to flow about the periphery of the stem of the tip so as to form a uniform mass completely enveloping the stem. When a pure plastic material is used, no particular difficulty is experienced in following the aforesaid practice, but when the plastic is reinforced with fibrous material such, for example, as Fiberglas, the reinforced plastic, in flowing, for example in opposite directions circumferentially about the stem, may fail to coalesce at the place where the approaching streams meet thus forming an area of weakness or even fissures in the shuttle body resulting in a defective article. Such an area of weakness as just referred to is analogous to the so-called "cold shut" sometimes occurring in metal casting which results when portions of the metal entering the mould become so chilled before meeting that they fail to intermingle and weld. For convenience herein the imperfections which occur in attempting to mould a reinforced plastic about the axial stem of a conventional shuttle tip are referred to as "cold shuts."

One object of the present invention is to provide a shuttle tip so designed that it may be anchored to a plastic shuttle body comprising a reinforced plastic during the moulding of a shuttle body without weakening the shuttle body by the formation of cold shuts therein. A further object is to provide a shuttle tip having a stem so designed that it is not necessary, during moulding, that the plastic completely encircle the periphery of the stem, thus avoiding the occasion for the formation of cold shuts. A further object is to provide a shuttle tip having a stem so designed that while a portion of its periphery is embedded in the plastic of the shuttle body another portion of its periphery is exposed and, in effect, forms a portion of the outer surface of the shuttle. A further object is to provide a shuttle tip having an eccentrically arranged stem so externally shaped as to expose one surface at the outside of the shuttle and having other portions of its surface shaped to obtain a key-type anchorage within the plastic of the moulded shuttle body. Other and further objects and advantages of the invention will be pointed out in the following more detailed description and by reference to the accompanying drawings wherein Fig. 1 is a fragmentary plan view of one end of a shuttle body having the improved tip of the present invention embedded therein;

Fig. 2 is a fragmentary edge view of the shuttle of Fig. 1;

Fig. 3 is an elevation of the improved tip of the present invention viewed from the opposite side from that shown in Fig. 2;

Fig. 4 is a section, to larger scale, substantially on the line 4—4 of Fig. 3;

Fig. 5 is an elevation of the shuttle tip viewed from its rear;

Fig. 6 is a horizontal section through a mould showing how the improved tip is disposed within the mould preparatory to the moulding of the plastic shuttle body; and Fig. 7 is a fragmentary section, to larger scale, substantially on the line 7—7 of Fig. 1.

Referring to the drawings, the numeral 1 designates the body of a weaving shuttle of generally conventional shape and dimensions but which, in accordance with the present invention, is of moulded synthetic resin, preferably having incorporated therein a reinforcing material, for example Fiberglas which is the trade name for products made of or with glass fibers ranging from 5 to 600 one hundred thousandths of an inch in diameter.

The shuttle tip 4 (Fig. 3) according to the present invention is of metal, usually steel, and comprises the head 5 having an external, peripheral surface 6 (Fig. 4) of generally conical or acorn shape which is coaxial with the shuttle body when the tip has been assembled with the latter. The head 5, as here illustrated, has a flat rear or bottom surface 7 (Fig. 4) which is inclined to the axis of the head. The tip also comprises the stem portion 8, integral with the head 5 and which, as shown in Fig. 4, is eccentric with respect to the head 5 and has an outer surface 9 which is exposed to view in the completed shuttle and which forms a smooth, continuation of the conical peripheral surface 6 of the head. This outer surface 9 of the stem is so contoured that when the tip is assembled with the shuttle body the surface 9 merges smoothly with and is flush with the outer surface of the shuttle body at that part in which the stem is embedded so as to form, in effect, a portion of the outer surface of the shuttle. As here illustrated the stem is located at one side of the shuttle, preferably at the side opposite that at which the yarn delivery eye is located. As illustrated, the stem is four-sided (Fig. 7) in transverse section, comprising, in addition to the outer surface 9, a substantially flat inner face 10 (here shown (Fig. 4) as inclined to the rear face 7 of the head at an angle of approximately 120°) and the opposite side faces 16 and 17. As shown, the stem is of relatively small circumferential extent, for example the surface 9 where it merges with the surface 6 of the head is of approximately 30° of arc.

As shown in Figs. 2 and 4, the opposite side faces 16 and 17 of the stem are concave longitudinally so that the surface 9 comprises a portion of lesser transverse width interposed between portions of relatively greater width. As illustrated, the free end of the stem tapers from a relatively wide portion at 14 to an acute tip 15—the faces 18 and 19 which define the free end portion of the stem converging to an edge 20 (Fig. 3). Desirably, though not necessarily, the head 4 is provided with an internally screw threaded axial bore 21 (Fig. 4) extending forwardly from the surface 7 and which is designed to receive an anchoring bolt 22 (Fig. 1) extending forwardly through the end portion of the shuttle body.

In accordance with the present invention, it is contemplated that there will be provided a mould which, as diagrammetically suggested by way of example in Fig. 6, comprises the parts M and M' and a third part (not shown) similar to the part M', arranged at the opposite end of the part M. The part M of the mould is provided with a cavity C of a shape corresponding to the outer peripheral contour of the shuttle body to be moulded. Obviously suitable core elements (not shown) will be employed in accordance with customary and usual methods of moulding materials to form the bobbin-receiving and other desired cavities in the shuttle body. The part M' of the mould is provided with a central portion T, preferably of soft iron or other similar magnetic material having a cavity at its inner end shaped to receive the conical head portion 5 of the shuttle tip. Surrounding the portion T is a coil W of conducting wire which, when energized with electric current causes the part T to become magnetized sufficiently to hold the head 5 of the shuttle tip 4 firmly in place and properly positioned with reference to the mould cavity during the moulding operation. While a magnet is desirable as a means for holding the tip in place it is contemplated that any other appropriate means may be provided for the purpose.

In assembling the mould parts, the head 5 of each respective tip is first introduced into the cavity in one of the parts M' of the mould and the coils W are energized so that the magnetic cores T hold the shuttle tips properly positioned. The parts M' are now assembled with the part M and the plastic material is introduced into the cavity C. As the plastic is introduced into the mould it flows freely into contact with the faces 7, 10, 16, 17, 18 and 19 of each shuttle tip, and because of the shape of the stem, particularly by reason of the concavity of the faces 16 and 17, the key-type anchorage is provided between the tip and plastic body portion of the shuttle such that when the plastic material has set the tip is firmly anchored in position so that it can neither move axially nor rotate.

Because the surface 9 of the stem is to be exposed in the completed shuttle (that is to say it is not to be encased in the plastic material) it is not necessary for the plastic, in flowing into the mould, to encircle the stem peripherally but only to flow into intimate contact with the surfaces 10, 16 and 17. No difficulty is experienced in causing the plastic to flow in this manner and since the streams of plastic flowing into contact with the faces 16 and 17 of the stem are not required to merge and intermingle in the vicinity of the face 9, the difficulties previously experienced in attempting to flow plastic about a part so as completely to encircle the latter, are avoided. Thus it becomes possible in accordance with the present invention to anchor the tip to the material of the shuttle body with the certainty that all of the expected intimacy of contact between the tip and the moulded material will be attained in each case and that no incipient cracks or lines of weakness will be occasioned by failure of the flowing plastic to coalesce. It has been found in practice that a single stem, such as here disclosed, is amply sufficient to hold the tip firmly anchored in position even though this stem be eccentrically located. However, to provide additional anchorage the head 5 may be provided with the screw threaded bore 21, as above described, and after the body of the shuttle has been moulded a bore may be formed in the end portion of the shuttle body axially aligned with the bore 21 in the head of the stem and a bolt 22 may be introduced to provide a rigid anchorage extending axially of the tip.

While one desirable form of tip has here been illustrated and described it is to be understood that the invention is broadly inclusive of any and all modifications falling within the scope of the appended claims.

I claim:

1. In combination, in a weaving shuttle having a molded body of plastic material, a metal tip comprising a substantially conical head having a substantially flat rear surface and having an axial screw-threaded bore extending forwardly from said surface, and a single elongate stem integral with the head, the stem being solid and free of openings and having a longitudinally extending surface which is exposed and flush with the outer surface of the shuttle body, the stem being otherwise embedded in the material of the shuttle body, the stem and its exposed surface having longitudinally spaced relatively wide portions and an intermediate relatively narrower portion whereby the material of the shuttle body in which the stem is embedded forms a key-type anchorage for the tip.

2. In combination, in a weaving shuttle having a molded body portion of reenforced plastic material, a metallic tip having a substantially concave head and a single attaching stem integral with the head, the stem being elongate and eccentrically located with respect to the axis of the head, the stem being solid and free of openings therethrough and being four-sided in transverse section, one of its longitudinal sides being exposed at the outer surface of the shuttle body and being flush with said surface and forming in effect a portion of the outer surface of the shuttle body, the material of the shuttle body being in intimate contact with all surfaces of the stem, except said exposed surface, the stem comprising longitudinally spaced portions of relatively greater width and an intermediate portion of relatively lesser width whereby the material of the shuttle body forms a key-type anchorage for the tip.

3. In combination, in a weaving shuttle, a molded shuttle body of plastic material, a metallic tip having a substantially conical head and a single elongate attaching stem integral with the head and eccentrically disposed with reference to the axis of the head, the stem being devoid of openings and being of polygonal transverse section and having an exposed longitudinal face which forms a smooth continuation of the peripheral surface of the head and which is flush with the outer surface of the shuttle body, the stem having a plane inner surface which diverges from the axis of the head and opposite side surfaces which are longitudinally concave whereby spaced portions of the stem are wider than an intermediate portion, the material of the shuttle body making intimate contact with said concave side surfaces of the stem, thereby providing a key-type anchorage for the tip.

4. In combination, in a weaving shuttle having a molded body of plastic reenforced with glass fiber, having therein a bobbin receiving chamber, a tip at the end of the body comprising a substantially conical head and a single retaining stem, the stem being devoid of openings and being integrally joined to the head at one side of the axis of the latter and having an inner surface which diverges from the axis of the head, the stem also having an exposed outer surface which is a smooth continuation of the peripheral surface of the head and which is flush with the outer surface of that portion of the shuttle body in which the stem is embedded, the outer surface of the stem where it joins the head being of a circumferential width not substantially exceeding 30° of arc, the stem and its said exposed outer surface having a portion of relatively lesser width interposed between portions of relatively greater width, the material of the shuttle body intimately contacting all of the surface of the stem except said exposed outer surface and by such contact with the narrower portion of the stem providing a key-type anchorage for the tip.

References Cited in the file of this patent

UNITED STATES PATENTS

| 1,368,975 | Shambow | Feb. 15, 1921 |
| 1,527,043 | Gladue | Feb. 17, 1925 |
| 2,436,356 | Gelpke | Feb. 17, 1948 |

FOREIGN PATENTS

| 58,549 | Germany | Sept. 12, 1891 |
| 357,711 | France | Nov. 21, 1905 |
| 906,514 | France | May 22, 1945 |